UNITED STATES PATENT OFFICE.

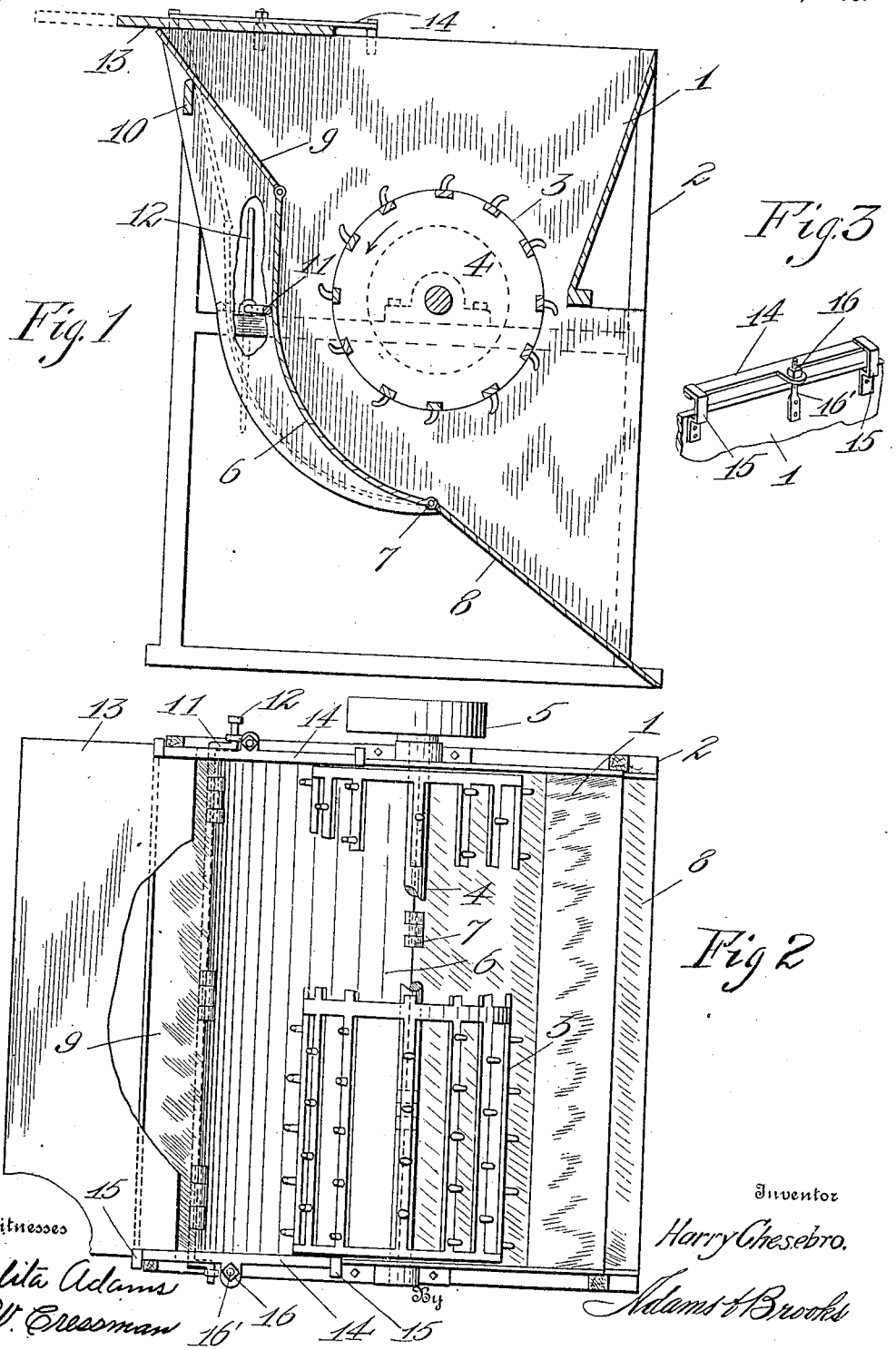

HARRY CHESEBRO, OF SEATTLE, WASHINGTON.

HAY-BEATER.

No. 926,241.

Specification of Letters Patent.

Patented June 29, 1909.

Application filed June 4, 1908. Serial No. 436,721.

*To all whom it may concern:*

Be it known that I, HARRY CHESEBRO, a citizen of the United States of America, and a resident of the city of Seattle, in the county of King and State of Washington, have invented certain new and useful Improvements in Hay-Beaters, of which the following is a specification.

My invention has particular reference to machines for operating on baled hay to "shake" or loosen the same for rebaling.

The primary object is the provision of an improved machine capable of adjustment or regulation to meet existing conditions of unequal density or compactness of the bales for a uniform spreading of the hay.

Further objects and advantages will be set forth as the description progresses, and the scope of the invention defined in the claims.

The accompanying drawing illustrates an embodiment of my invention in such form as now preferred by me.

With reference to the drawing, wherein similar reference numerals designate corresponding parts throughout: Figure 1 is a transverse sectional view of a rotary beating machine embodying my invention. Fig. 2 is a plan view thereof with the part adjusted to the position indicated by dotted lines in Fig. 1, portions of some of the parts being broken away, and Fig. 3 is a fragmentary detail view.

Referring to the particular type of the machine shown, reference numeral 1 designates a hopper like casing contained in a frame 2 and having positioned therein a rotary beater 3 carried by a shaft 4 journaled on said frame. Secured to shaft 4 is a pulley 5 to which power is applied to rotate the beater for action upon the flakes or layers of hay which are fed to casing 1. Owing to the unequal density or compactness of the layers or flakes of different bales I have found it desirable in furtherance of a more perfect and uniform separation to provide means for retaining the layers of greater density under action of the beater for a longer period than those of lesser density. With the foregoing object in view I have provided for the hopper or casing 1 an adjustable throat piece conveniently comprising a curved plate section as 6 swingably connected at 7 with an inclined apron 8 of said hopper for adjustment toward and from beater 3. Hinged to the upper end of throat piece 6 is an inclined guide plate 9, having its upper portion slidably engaged on a suitable support, as 10.

Reference numeral 11 indicates means for controlling the adjustment of the throat piece, on its connection 7, toward and from the rotary beater, said means being in the form of a crank journaled in frame 2 and adapted upon being rotated, as by an operating handle 12, to either engage the outer face of said throat piece and force the throat inwardly, or to be disengaged therefrom, so as to release the throat piece, whereupon it will be moved by pressure of the material in the hopper, to the position indicated by broken lines in Fig. 1. When the throat piece is in this position, guide 9 stands substantially perpendicular to permit of the material passing freely downwardly.

Reference numeral 13 indicates a guard slidably supported on the top of hopper 1 for adjustment over the throat of the machine toward and from the rotary beater, through the medium of which the mouth of the hopper can be more or less restricted to compel the hay being thrown into the hopper either substantially directly into the throat or at any desired distance therefrom. As now considered guard 13 is slidably supported in guides 14, having resilient stems 15, which, upon proper adjustment of nuts 16 on stems 16′, fixed to the side walls of hopper 1, yield, thereby permitting of the guides proper, by binding on the guard to hold the same adjusted.

Having thus described my invention, what I claim as new, and desire to secure by Letters Patent of the United States of America, is:

1. A machine of the character described comprising a casing, a beater mounted therein for rotation, a throat plate in said casing mounted for adjustment toward and from said beater, an inclined guide for guiding the material onto said throat plate hinged to the upper portion thereof, and means slidably supporting said guide.

2. A machine of the character described comprising a casing, a beater mounted therein for rotation, a curved throat plate hinged at its lower portion for adjustment toward and from said beater, means for adjusting said throat plate, a guide hinged to the upper portion of said throat plate for guiding material thereto, and means slidably supporting said guide.

3. A machine of the character described comprising a casing, a beater mounted therein for rotation, a throat plate in said casing mounted for adjustment toward and from said beater, an inclined guide for guiding the material onto said throat plate arranged above said throat plate and connected thereto for relative angular adjustment, and means slidably supporting said guide.

Signed at Seattle, Washington this 16" day of May 1908.

HARRY CHESEBRO.

Witnesses:
A. A. BOOTH,
ARLITA ADAMS.